3,112,178
METHOD OF PREPARING TiO₂
Harold Judd, Hamilton, Ohio, assignor to Champion Papers Inc., Hamilton, Ohio, a corporation of Ohio
Filed Jan. 27, 1961, Ser. No. 85,333
6 Claims. (Cl. 23—202)

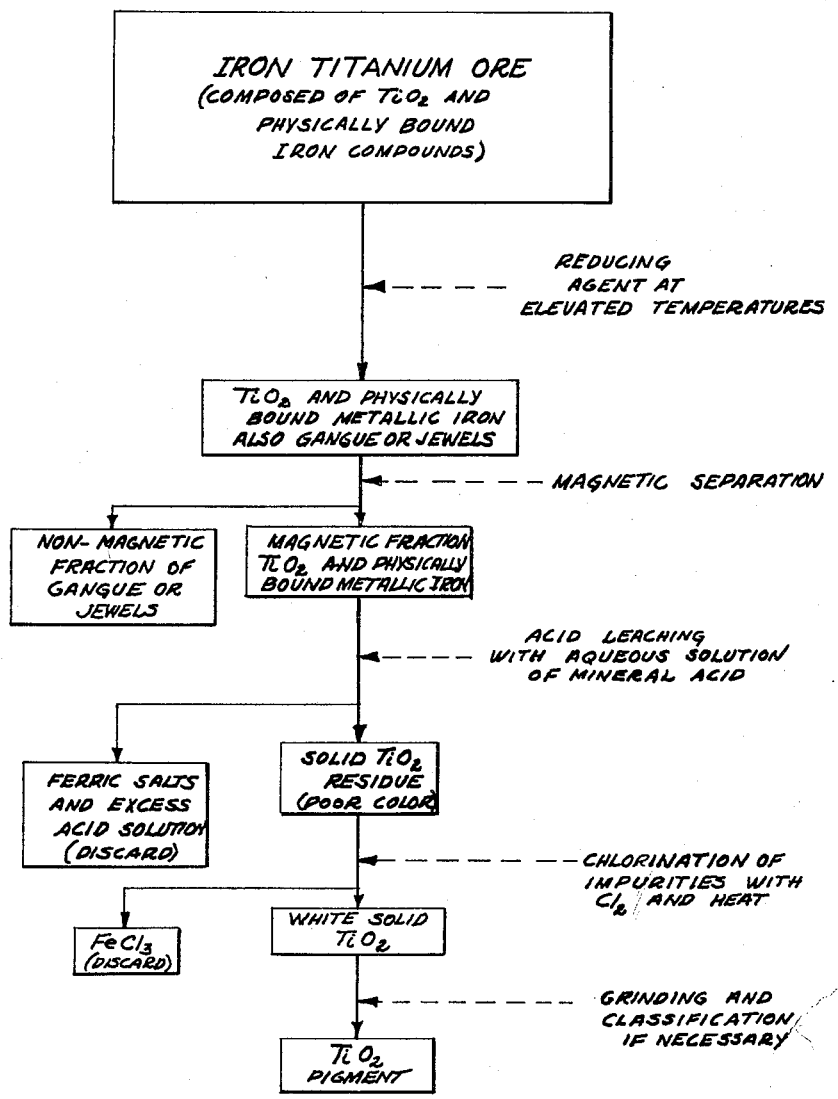

This invention relates to the preparation of titanium dioxide from iron-titanium ores and more particularly to its preparation without the necessity of solubilizing or volatilizing the titanium content of the ore during the process.

The principal methods employed commercially to produce titanium dioxide suitable as pigments are the so-called "sulfate" and "chloride" processes. These produce an extremely high quality $TiO_2$ product but nevertheless suffer from the disadvantage that they require very careful control of the operating conditions in order to remove the iron impurities. The so-called "sulfate" process employs great quantities of concentrated sulfuric acid to react with the titanium for solubilization in water followed by precipitation, washing and calcining. The "chloride" process requires volatilization of the titanium as the tetrahalide followed by purification and calcining. The problems encountered with these complex processes requiring a critical purification by dissolution or vaporization techniques have been primarily responsible for the fact that $TiO_2$ is relatively expensive pigment.

An object of this invention is therefore an economical and relatively simple process for the production of $TiO_2$.

Still another object of this invention is the production of a low cost $TiO_2$ material which is convertible to a pigment that is highly suitable as a filler for paper and other materials.

A further object is the production of a white $TiO_2$ product by the selective removal of impurities while retaining the titanium dioxide in substantially its original form.

Other objects will be readily apparent from the following description.

In accordance with this invention it has been found that an essentially iron free titanium dioxide product may be prepared from an ore comprised of rutile or anatase titanium dioxide held in a fine matrix of hematite by the consecutive steps of (1) subjecting the ore to hydrogen or other reducing gas at a temperature of at least 500° C. for a period sufficient to reduce at least 75% by weight of iron oxides in the ore to iron, (2) magnetically separating the magnetic iron titanium fraction from the non-magnetic gangue, (3) leaching the magnetic fraction with a dilute aqueous solution of a mineral acid to remove iron therefrom and to produce a titanium dioxide residue, and (4) chlorinating the said titanium dioxide residue in an oxidizing atmosphere to produce an essentially iron free titanium dioxide product having a high degree of whiteness, and usually a G.E. brightness of at least 90. The resultant material can then be ground if necessary, for example mechanically, to develop pigmentary properties and thereby produce a material which is suitable as a filler for paper, coatings and the like. Where particle size is not an important factor, i.e., in certain plastic moldings, the unground material can be used as such.

The drawing outlines the general steps of the process.

The process of this invention is highly effective in separating $TiO_2$ from particles of iron-titanium ore wherein the titanium and iron are only physically combined and are not bound by a chemical complex. An effective removal of $TiO_2$ is not facilitated from particles of ore such as the true ilmenites, for example India ilmenite, wherein the titanium and iron are chemically bound. A particularly suitable ore for use in the process of this invention is the so-called "Florida ilmenite" which, in fact, is not a true ilmenite since microscopically it has been found to be largely comprised of rutile titanium dioxide held in a fine matrix of hematite ($Fe_2O_3$). The ore may contain minor amounts, i.e., up to 15% by weight but preferably not over 5%, of chemically bound iron-titanium particles since these will mostly be separated as "gangue" or jewels in the magnetic separation step.

For economic reasons as well as for maximum efficiency of the separation, the ore should contain at least 50% by weight of $TiO_2$. The "Florida ilmenite" often contains in excess of 60% $TiO_2$. The method of this invention is also suitable for the separation of iron from ores containing non-chemically bound anatase $TiO_2$. Where the particle size of the ore is greater than ordinary beach sand it should be further reduced in size before use.

A suitable ore is first subjected to the presence of a reducing agent, preferably a gaseous one, at an elevated temperature to reduce the majority of the iron oxide content to metallic iron. Examples of suitable reducing agents are carbon monoxide, natural gas and hydrogen. Hydrogen gas has been found to be particularly suitable for this purpose because it leaves no residue of carbon.

The efficiency of the reduction operation is determined primarily by the temperature of the reaction and the length of exposure to the reducing agent. A temperature of 1000° C. for a period of one hour with an excess of hydrogen gas effects an almost complete conversion of the iron oxides to iron. Somewhat lower temperatures and significantly shorter periods of time can be employed but at a sacrifice to the efficiency of the overall operation. When less than 70% by weight of the iron compounds in the ore are converted to metallic iron the final $TiO_2$ pigment is ordinarily too impure for most purposes. Ordinarily, temperatures of 500° C. up to the melting point of the ore can be employed for periods of time from 5 minutes to 12 or more hours; the longer periods of time being employed with the lower temperatures and the shorter periods of time with the higher temperatures. Greatest efficiency of the reduction operation is ordinarily encountered in the range of 900° to 1100° C. In most cases, especially with gaseous reducing agents, it is desirable to employ a considerable excess of reducing agent over that theoretically required to convert all of the iron oxides to iron.

The reduction operation can be carried out by merely exposing the ore particles to the reducing agent in a closed container with the application of heat. A fluid bed reactor containing the ore and having a port and exit for the reducing gas is highly satisfactory. Pressures in excess of atmospheric pressure are not ordinarily required. For proper temperature control the gases should be preheated, i.e., to the reaction temperature, before exposure to the ore. The excess reducing agent emitted from the reactor can be purified, i.e. of water, and cycled for reuse.

Table I illustrates the effect of variations in temperature on the percentage of iron in the ore which is thereby reduced. The ore is a "Florida ilmenite" having a particle size such that 100% passes through a 60 mesh screen.

TABLE I

*Ore Reduction Data*

| Sample Number | Temp., °C. | Size of Sample, g. | Time, hr. | Percent by Weight of Iron Reduced |
| --- | --- | --- | --- | --- |
| 1 | 800 | 100 | 1 | [1] 40.8 |
| 2 | 900 | 100 | 1 | [1] 73.0 |
| 3 | 1000 | 100 | 1 | [1] 98.8 |

[1] An excess of hydrogen was used in each case.

It will be noted, of course, that no actual purification of the ore is accomplished in this step.

The reduced ore is subjected to the action of a magnet to separate the strongly magnetic iron titanium material (which is composed mainly of metallic iron and titanium dioxide in a physically bound form) from the non-magnetic "gangue" or jewels (a small amount of chemically bound iron oxides and $TiO_2$ along with other materials). The latter will remain as a residue. A weak (low intensity) permanent or electromagnet is suitable for this purpose since it does not have sufficient attraction for the "gangue."

Obviously any suitable means may be employed for effecting the magnetic separation. One such means comprises forming a thin layer of the reduced ore particles on a substrate and merely passing the magnet over the surface of the layer. The non-magnetic fraction will remain as a residue on the substrate.

The following table shows the results of a highly efficient magnetic separation as performed on the hydrogen reduced ore of Sample Number 3 of Table I. A low intensity permanent magnet was employed.

TABLE II

*Yield of $TiO_2$ From Magnetic Separation*

[Percentages being by weight]

| Physical Analysis | Grams | Percent of Reduced Ilmenite |
| --- | --- | --- |
| $TiO_2$+Fe (accepts) | 7.695 | 95.8 |
| "Gangue" (rejects) | 0.344 | 4.2 |

| Chemical Analysis | Percent $TiO^2$ | Percent Fe | Total (Percent $TiO^2$+Fe) |
| --- | --- | --- | --- |
| Accepts | 68.0 | 28.0 | 96.0 |
| Rejects | 20.4 | 10.3 | |

Although the "rejects" contain a considerable percentage of chemically bound $TiO_2$ with iron and/or iron oxides, this represents less than 2% by weight of the reduced and unseparated ore.

The magnetic fraction of the reduced ore is now leached with a dilute aqueous solution of a mineral acid to remove the metallic iron content. Usually the residue of the acid leaching operation will contain in excess of 95% by weight $TiO_2$. The remainder is composed primarily of iron and other colored oxides in various stages of oxidation.

The preferred mineral acid for the leaching operation is hydrochloric acid since its anion can effectively be removed without contamination of the final product. Sulfuric acid, while also suitable, is more difficult to completely remove. In addition, the $TiO_2$ is filtered from an aqueous solution of ferric sulfate with considerably more difficulty than is a solution of ferric chloride.

It should be noted that while it would, at least theoretically, be possible to avoid the acid leaching step by chlorinating the magnetic fraction directly in an oxidizing atmosphere, experience has shown that the reaction is so violent, even at low temperatures, that a uniform white product is difficult to produce. The use of the acid leaching operation to remove in this way the bulk of the iron causes the subsequent chlorination step to proceed smoothly and uniformly.

The acid leaching operation comprises contacting the magnetic fraction of the reduced $TiO_2$ ore with a dilute aqueous solution of acid to remove a substantial amount of the free iron. Although removal of as much as 50% by weight of the iron will greatly facilitate the ease of the subsequent chlorination operation, there is no difficulty in removing 80 to 95% or more in this step. While the product of this step will ordinarily analyze from 90 to 98% by weight $TiO_2$, it has a poor color and hence is unsatisfactory for pigmentary purposes.

The reduced ore is combined with sufficient acid to permit removal of the greater part of the iron without dissolving appreciable amounts of the $TiO_2$ content. The reaction is quite rapid and hence room temperature is perfectly satisfactory. By keeping the temperature of the mixture below 150° C., and by avoiding excessive concentrations of acid, no more than 1% by weight of the $TiO_2$ is solubilized. Since the metallic iron content is solubilized by the formation of soluble salts with the anion of the acid, the amount of metallic iron solubilized will be governed by the amount of acid employed. Hence, maximum solubilization of the metallic iron is attained if for each equivalent thereof at least one equivalent of acid is employed. Since ferric salts are formed with the dilute acids, 3 mols of hydrochloric acid or 1½ mols of sulfuric acid will be theoretically required to dissolve each mol of iron present.

Since, as previously mentioned, the subsequent chlorination step is easily performed if as much as 50% of the metallic iron is removed in the acid leaching step, the minimum amount of acid which can effectively be employed is that which is required to dissolve about 50% by weight of the metallic iron content of the magnetic fraction of the reduced ore. As a practical matter, however, and indeed for maximum efficiency, at least 1 equivalent of acid should be used for each equivalent of metallic iron in the magnetic fraction of the reduced ore. There is no precise limit to quantity of acid which can be used, provided of course, that its concentration in the aqueous solution does not become so excessive as to dissolve a substantial amount of the $TiO_2$. In this regard it has been determined that exposure of the magnetic fraction of the reduced ore to an aqueous solution of acid which contains more than about 20% by weight of acid results in a loss of some of the $TiO_2$ by dissolution. On the other hand, when the concentration of acid solution is less than about 0.05% by weight of acid, the speed of the dissolution is undesirably slow.

The following table shows the effect of variations in acid concentration and quantity of acid upon the Fe removed. The ore was a "Florida ilmenite," reduced with hydrogen (Sample No. 3 of Table I), and subjected to a low intensity permanent magnet as described in Table II to produce a magnetic fraction containing about 68% by weight $TiO_2$ and 28% by weight of physically bound metallic iron.

Table III

| Sample Number | Grams Magnetic Fraction Used | Aqueous Acid Conc. (percent by wt. of Acid in Total Acid Solution) | Grams Acid Used | Temp., °C. | Time, hrs. | Mesh Size of Ore | Percent by wt. Fe in Magnetic Fraction | Percent by wt. Fe in Residue After Leaching |
|---|---|---|---|---|---|---|---|---|
| 1 | 10 | 10 | 5.2 | 103 | 1 | −200 | 28 | 1.6 |
| 2 | 10 | 3 | 5.2 | 101 | 1 | −200 | 28 | 1.1 |
| 3 | 10 | 5 | 5.2 | 102 | 1 | −200 | 28 | 1.2 |
| 4 | 10 | 1 | 2.6 | (¹) | 1 | −60 | 28 | 1.4 |
| 5 | 10 | 0.5 | 2.6 | (¹) | 1 | −60 | 28 | 2.2 |
| 6 | 10 | 0.25 | 2.6 | (¹) | 1 | −60 | 28 | 3.4 |

¹ Room temp.

The acid leached product (when at least one equivalent of acid has been used for each equivalent of iron in the magnetic fraction) will ordinarily be analyzed to contain in excess of about 95% by weight $TiO_2$ with a substantial proportion of the remainder being iron in various stages of oxidation.

The acid leached solid $TiO_2$ residue is then chlorinated in an oxidizing atmosphere to remove the last traces of iron and other colored impurities. The product resulting from this step will most often have a brightness as measured on a General Electric brightness meter of at least about 90 and often as high as 93 or more. Since the colored impurities are present in trace amounts the color of the product rather than chemical analysis is the measure of the degree of chlorination.

The acid leached $TiO_2$ residue is preferably dried of excessive moisture before chlorination although this may be accomplished during initial phases of the chlorination step since it is performed at elevated temperatures. A fluid bed reactor provides a highly efficient means for contacting the acid leached solid residue with the chlorine.

The temperatures of the chlorination reaction can vary somewhat depending upon the type and proportion of impurities present and upon the length of the chlorination. Temperatures much below 600° C. even for very extended periods of time generally fail to produce a suitably white $TiO_2$ product. Within the range of 900° C. up to the melting point of the acid leached residue (about 1800° C.), suitably white $TiO_2$ products are produced within reasonable periods of time, usually 4 to 24 hours.

While it is not necessary to further subdivide the $TiO_2$ residue prior to chlorination, it materially improves the contact of the chlorine with the colored impurities. Thus grinding the $TiO_2$ residue so that it passes through a 200 mesh screen insures adequate contact.

The amount of chlorine employed is not critical other than that it should be in excess of that which would be theoretically required to react with the colored oxide impurities present. Ordinarily a several fold excess of chlorine is advantageous. The presence of a small amount of air during the chlorination has been found to suppress the formation of titanium tetrachloride. The gaseous discharge from the reaction is comprised largely of unreacted chlorine and ferric chloride.

The following table illustrates the chlorination of the acid leached solid residue of Table III, Sample Number 4. The chlorination was carried out in a fluid bed reactor with a several fold excess of chlorine. The residue had been dried to a moisture content of less than about 1% by weight of $H_2O$ before chlorination.

TABLE IV

*Chlorination Conditions*

| | |
|---|---|
| Temperature of reactor | 950° C. |
| Time of reaction | 10 hrs. |
| Flow rate of chlorine | Ca. 68 g./hr. |
| Size of sample chlorinated | 50 g. |
| Flow rate of air | 0.1 ft.³/hr. |
| Particle size of ore | −200 mesh |

The product resulting from the chlorination is nearly pure white in appearance. It has a brightness of 93 as measured on a General Electric brightness meter.

The chlorinated product is then ground if desired, for example by ball milling, to develop pigmentary properties and classified to obtain the finished product.

It is to be understood that while the $TiO_2$ product resulting from the process of this invention is not in all cases equal in properties of brightness and opacity to many of the commercially available $TiO_2$ pigments, nevertheless it is highly suitable for many pigmentary uses and applications and can be readily prepared by a comparatively inexpensive process.

Having described the invention in detail it is obvious that some modifications, all within the spirit and scope of the invention, will occur to those skilled in the art. Accordingly, the invention is limited only as defined hereinafter, wherein what is claimed is:

1. Method for the preparation of an essentially iron free titanium dioxide product from an ore comprised of titanium dioxide physically held in a fine matrix of hematite which comprises the steps of (a) subjecting said ore to a gaseous reducing agent at a temperature of at least 500° C. for a period sufficient to reduce at least 70% by weight of iron oxides in the ore to metallic iron, (b) magnetically separating the magnetic iron titanium fraction from the non-magnetic gangue, (c) leaching the said magnetic fraction with a dilute aqueous solution of a mineral acid to remove the metallic iron therefrom and to produce a titanium dioxide residue, and (d) chlorinating the said titanium dioxide residue in an oxidizing atmosphere with an amount of chlorine in excess of that required to react with the colored oxide impurities present in said residue to produce an essentially iron free white titanium dioxide product.

2. Method according to claim 1 wherein the said ore comprises rutile titanium dioxide held in a fine matrix of hematite.

3. Method according to claim 1 wherein the said mineral acid is hydrochloric acid.

4. Method according to claim 1 wherein the said reducing agent is hydrogen gas.

5. Method for the production of an essentially iron-free titanium dioxide product which comprises the steps of (a) subjecting an iron-titanium ore, wherein the iron and titanium are only physically combined, to a gaseous reducing agent at a temperature of at least 500° C. for a period sufficient to reduce at least 70 percent by weight of iron oxides in the ore to metallic iron, (b) magnetically separating the magnetic iron titanium fraction from the non-magnetic gangue, (c) leaching the said magnetic fraction with a dilute aqueous solution of a mineral acid to remove the metallic iron therefrom and to produce a titanium oxide residue, and (d) chlorinating the said titanium dioxide residue in an oxidizing atmosphere to produce an essentially iron-free titanium dioxide product having a brightness of at least 90.

6. Method according to claim 5 wherein the ore contains less than 15 percent by weight of chemically bound iron-titanium particles.

References Cited in the file of this patent

UNITED STATES PATENTS

| | | |
|---|---|---|
| 1,542,350 | Whittemore | June 16, 1925 |
| 1,845,342 | Saklatwalla | Feb. 16, 1932 |
| 2,184,884 | Muskat et al. | Dec. 26, 1939 |
| 2,631,924 | McKinney | Mar. 17, 1953 |
| 2,631,941 | Cole | Mar. 17, 1953 |
| 2,848,303 | Cooper | Aug. 19, 1958 |

OTHER REFERENCES

Dana's Manual of Mineralogy, 14th Ed., 1929, p. 196, John Wiley and Sons, Inc., N.Y.

Hackh's Chem. Dictionary, Third Ed., Revised, 1944, p. 402. The Blakiston Co., Philadelphia.

J. W. Mellor's "A Comprehensive Treatise on Inorganic and Theoretical Chemistry," vol. 13, 1934 Ed., page 805. Longmans, Green and Co., N.Y.

Thornton's book on "Titanium," 1927 Ed., p. 35, The Chemical Catalog Company, Inc., N.Y.